PROCESS FOR THE PURIFICATION OF SUGARS AND THEIR DERIVATIVES

3,219,484

Bruce Maxwell Smythe, Balgowlah, New South Wales, and Clarence Junior Moye, Forestville, New South Wales, Australia, assignors to The Colonial Sugar Refining Company Limited, Sydney, New South Wales, Australia
No Drawing. Filed Aug. 2, 1962, Ser. No. 214,216
Claims priority, application Australia, Aug. 7, 1961, 7,764/61; Mar. 7, 1962, 15,129/62
11 Claims. (Cl. 127—64)

This invention relates to a new process for the purification of various monosaccharides and oligosaccharides, and their derivatives.

In the purification of sugars, for example, sucrose, using dissolution and recrystallization in water, the high solubility of sugars in water leads to many disadvantages. Also, various impurities in the sugar are soluble in water and subsequently have to be removed by chemical or physical means before crystallizatiton. The high solubility of sugars and the presence of impurities both result in highly viscous syrups and process materials which make such operations as heating, pumping, crystallizing, classification of crystals and centrifugal separation of crystal and syrup difficult. Moreover, the high solubility of sucrose at low temperatures complicates the recovery of sugars by crystallization from low purity aqueous solutions.

These factors impede the development of a satisfactory continuous crystallization process for sugars, particularly sucrose, from aqueous solution.

A further disadvantage in the use of aqueous solutions of sugars is the decomposition of sugars in aqueous solutions, particularly at high temperatures. For example, sucrose undergoes autocatalytic decomposition, particularly above 80 degrees centigrade with the formation of reducing sugars and colored decomposition products. The rate of decomposition is increased by the hydrogen ion concentration of the medium, and even in pure water the hydrogen ion concentration is sufficient to produce decomposition. This instability of sucrose leads to losses in the recovery and purification of sucrose. The stability of other sugars in aqueous solutions is also dependent on temperature and hydrogen or hydroxyl ion concentration.

These various disadvantages in the purification of sugars and their derivatives can be overcome according to the invention by a process using certain high-boiling alcohols as solvents for the sugars. It has been found that, while most sugars or their derivatives are not very soluble in alcohols such as methanol and ethanol, their solubility is considerably higher in an alcohol whose molecule contains the structural grouping

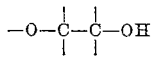

The glycols, for example, ethylene glycol, contain the abovementioned structural grouping and generally dissolve sugars and their derivatives readily. However, they are rather viscous solvents and form with sugars very viscous solutions which present some of the difficulties encountered with aqueous solutions.

Solvents having the abovementioned structural grouping and having much greater utility as solvents for sugars and their derivatives include derivatives of glycols such as ethylene glycol monoalkyl ethers, ethylene glycol monoesters, diethylene glycol monoalkyl ethers and diethylene glycol monoesters. Furfuryl alcohol types, tetrahydrofurfuryl alcohol types, and 2-hydroxymethyl tetrahydropyran types are also examples of types of molecules which contain the abovementioned grouping and which are useful solvents for sugars and their derivatives. These alcohols generally have a lower viscosity and form less viscous solutions with sugars than do the glycols.

Most of these alcohols are miscible with water in all proportions, even when their boiling point is as high as 200 degrees centigrade, where as the simple alcohols beyond propyl alcohol are only partially miscible. It is believed that the above structure allows the two oxygen atoms to be the correct distance apart for hydrogen bonding with the two hydrogens of the water molecule, leading to miscibility of these alcohols containing the grouping

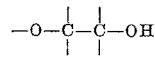

with water.

This grouping is also expected to facilitate hydrogen bonding between these alcohols and the hydroxyl groups of sugars, thus leading to greater solubility of sugars in high boiling alcohols of this type.

The temperature coefficient of solubility is greater than for aqueous solutions and this favors better recovery of the sugar or sugar products from these alcohols than from aqueous solutions.

The thermal stability of sugars in solvents of the type specified is greater than in aqueous solutions and thus in the purification of sugars and their derivatives less undesirable decomposition products are formed Solubilities of sucrose have been determined in several of these alcohols and are compared with those in ethanol, aqueous ethanol, and γ-butyrolactone in the following table.

Generally the solubility of monosaccharides is greater than that of sucrose at any specified temperature.

TABLE 1

[Solubility of sucrose (g./100 g. Solvent)]

| Temperature, ° C | 50 | 70 | 80 | 90 | 100 | 110 | 120 | 130 | 140 | 150 |
|---|---|---|---|---|---|---|---|---|---|---|
| Solvent: | | | | | | | | | | |
| Ethylene glycol monomethyl ether | | | 1.5 | 2.0 | 2.7 | 3.8 | 5.5 | 8.6 | 13.8 | |
| Tetrahydrofurfuryl alcohol | | | 1.3 | 1.8 | 2.6 | 3.6 | 5.2 | 8.0 | 12.7 | 20.0 |
| Diethylene glycol monomethyl ether | | | 0.8 | 1.0 | 1.4 | 1.9 | 2.7 | 4.0 | 5.8 | 9.0 |
| Ethanol | | | 0.5 | 0.72 | 1.05 | 1.55 | 2.25 | 3.6 | 5.6 | |
| γ-Butyrolactone | | | 0.05 | 0.03 | 0.26 | 0.5 | 1.0 | *3.0 | *7.8 | |
| 70% aqueous alcohol | 31.3 | 51.0 | 66.5 | 91.0 | 124.0 | *180.0 | | | | |

*Approximate values only due to some decomposition of sucrose.

Rates of decomposition of sucrose in the various solvents in Table 1 were followed by heating solutions containing sufficient sucrose to saturate the solution at the particular temperature. Samples were taken at various time intervals and the extent of decomposition of sucrose was determined by two sensitive methods.

(1) Measurement of light absorbance of the various solutions in the ultra-violet region of the spectrum was compared with a reference solution containing the same amount of sucrose and the alcohol. The thermal decomposition of sucrose gives rise to, amongst other products, 5-hydroxymethylfurfural. This compound has a strong absorption maximum at 282.5 m$\mu$. Increase in absorbance at this wavelength is a very sensitive measure of sucrose decomposition.

(2) Paper chromatography of the solutions carried out in butanol-ethanol-water as the solvent followed by development with silver nitrate or p-anisidine phosphate. This method detects breakdown of sucrose to other sugars such as glucose and fructose.

The results of these investigations show that sucrose is less prone to decomposition at high temperatures in these anhydrous alcohols than in water, aqueous alcohol or $\gamma$-butyrolactone.

For example, in tetrahydrofurfuryl alcohol at 145 degrees centigrade there was no evidence of breakdown of sucrose to glucose, fructose or 5-hydroxymethylfurfural after heating for 6 hours.

In $\gamma$-butyrolactone at 120 degrees centigrade there was little evidence of decomposition of sucrose. However, at 130 degrees centigrade there was marked decomposition of sucrose to glucose and fructose and 5-hydroxymethylfurfural after 6 hours' heating.

In a 70 percent aqueous ethanol solution there was marked decomposition of sucrose after 6 hours' heating at 110 degrees centigrade.

The decomposition of sucrose in solutions at high temperatures is autocatalytic due to the formation of acidic substances which accelerate the hydrolysis of sucrose. In these anhydrous alcohols this initial hydrolysis, which leads to the formation of acids, is inhibited.

As many impurities normally present in sugars and which normally dissolve or form colloidal solutions in concentrated aqueous solutions are insoluble in these alcohols, the purification of the solution before crystallization is facilitated. Furthermore, the lower solubility of sugars in these alcohols compared with water leads to lower viscosities and densities of the solutions, which facilitates such operations as heat and mass transfer, pumping, crystallization, classification of crystals by settling and the separation of crystal from mother liquor. The ease with which these operations can be effected is of importance in developing continuous crystallization processes.

The higher stability of sugars in these solvents is important in processes using these solvents for the purification of sugars and their derivatives, particularly sucrose.

It has generally been found that most sugars are soluble in all proportions in these solvents at temperatures above the melting point of the sugar. For example, fructose which has a melting point of 105 degrees centigrade is soluble in all proportions in ethylene glycol monomethyl ether at the boiling point of this solvent (124° C.), on cooling these very concentrated solutions very viscous syrups result. However, by a suitable choice of concentration and temperature, fructose can be readily purified by dissolution followed by cooling crystallization from the solvents described in this specification.

The high temperature coefficient of solubility of sugars in these selected solvents leads to useful methods of purification of sugars by dissolving the sugars in the said solvents at high temperatures and then allowing the solutions to cool under controlled conditions to produce purified crystalline products. While the sugar is dissolved in the hot solvent various methods of purification such as filtration, and centrifugation to remove undissolved solids, decolorization by activated carbons and the like may be used. In the production of a purified crystalline product from the hot solution various methods may be used. The solution can be allowed to cool slowly without seeding or agitation, or seed crystals and agitation may be employed to control crystal size.

The crystals can be separated from the mother liquor by conventional means such as filtration or centrifugation.

The following example illustrates but does not restrict the use of the aforesaid solvents for the purification of sugars.

*Example 1*

Sufficient anhydrous glucose was dissolved in ethylene glycol monomethyl ether at the boiling point of the solvent, 124° C. to give a saturated solution. The hot solution was filtered to remove any suspended solids and led into a vessel fitted with a cooling coil and agitator. A small quantity of fine seed crystals of glucose was added to the solution which was cooled at a controlled rate to allow the glucose to crystallize to the size required. The rate of crystal growth of glucose from such solutions is very much faster than from aqueous solutions. After the solution had been cooled to 30° C. the crystal and mother liquor were discharged to a basket centrifuge. On centrifugation and washing, pure, white crystalline glucose was obtained.

The usefulness of these solvents as media for purification by dissolution and crystallization is not restricted to sugars. Various sugar derivatives have been shown to be capable of purification by similar techniques to those described above for sugars.

The following examples illustrate but do not restrict the use of these solvents for purification of sugar derivatives.

*Example 2*

A technical grade of sucrose monopalmitate was dissolved in ethylene glycol monomethyl ether at 100° C. in which solvent it is very soluble at temperatures near the boiling point of the solvent. On cooling the solution in a stirred crystallizer a purified solid product (sucrose monopalmitate) was obtained. Before cooling to about 0° C. to produce the purified solid the solution can be further purified by conventional means such as filtration and decolorization.

*Example 3*

Sucrose distearate was dissolved in ethylene glycol monomethyl ether at a temperature of 120° C. at which temperature the sucrose ester is readily soluble. The hot solution was filtered and the pure solid sucrose distearate was obtained as a fine white powder by allowing the solution to cool slowly.

Perhaps the most useful application of the principles outlined in this specification is to the refining of sucrose.

A method essentially identical to that described in United States patent application Serial No. 208,171, filed June 15, 1962, by B. M. Smythe and R. Staker, and relating to the refining of sugars using aqueous alcohols can be used by substituting the specified anhydrous alcohols for the aqueous alcohols used in the abovementioned patent application.

The essential difference between these two methods can be outlined as follows:

In the present method higher temperatures are used in order to dissolve a sufficient quantity of sucrose, as the anhydrous alcohols used in this method have boiling points in excess of 120° C. It is therefore possible in many cases to achieve high temperatures at which the sucrose is sufficiently soluble without the need for presurized equipment. Moreover, in these solvents at temperatures up to about 150° C. as previously mentioned, sucrose is much more stable than in solvents containing water. Solubility is controlled purely by temperature and not as in the earlier proposed method by the ratio of alcohol to water.

The advantages of the use of the anhydrous alcohols as solvents rather than water lies in:

(1) The selective solubility of the solvents for sucrose compared with the impurities present in raw sugars.

(2) The lower viscosity of sucrose solutions based on these anhydrous solvents compared with aqueous solutions.

We claim:

1. A process for the purification of solid sugars and their derivatives consisting of dissolving said sugars or their derivatives at a temperature between 100° C. and 200° C. in an anhydrous high-boiling alcohol selected from the group consisting of ethylene glycol monoalkylether, ethylene glycol monoester, diethylene glycol monoalkylether, diethylene glycol monoester, furfuryl alcohol, tetrahydrofurfuryl alcohol and 2-hydroxymethyl tetrahydropyran; separating undissolved solids from said hot solution and subsequently cooling the solution to about ambient temperature to effect crystallization.

2. A process according to claim 1 in which the alcohol is a glycol monoalkyl ether.

3. A process according to claim 2 in which the ethylene glycol monoalkyl ether is ethylene glycol monomethyl ether.

4. A process according to claim 2 in which the diethylene glycol monoalkyl ether is diethylene glycol monomethyl ether.

5. A process according to claim 1 in which the sugar is sucrose.

6. A process according to claim 1 in which the sugar is a monosaccharide.

7. A process according to claim 6 in which the monosaccharide is glucose.

8. A process according to claim 6 in which the monosaccharide is fructose.

9. A process for the purification of solid glucose consisting of dissolving said glucose in anhydrous ethylene glycol monomethyl ether at to a temperature of 124° C., filtering the solution, adding fine seed crystals of glucose to said filtered solution and cooling said solution to 30° C. to complete crystallization of said glucose from said solution.

10. A process for the purification of solid sucrose monopalmitate consisting of dissolving said monopalmitate in anhydrous ethylene glycol monomethyl ether at to a temperature of 100° C. and cooling said solution in a stirred crystallizer to about 0° C. to complete crystallization of said sucrose monopalmitate from said solution.

11. A process for the purification of solid sucrose distearate consisting of dissolving said distearate in anhydrous ethylene glycol monomethyl ether at to a temperature of 120° C., filtering the solution and slowly cooling said solution to ambient temperature to complete crystallization of said sucrose monostearate from said solution.

References Cited by the Examiner

UNITED STATES PATENTS

| | | | |
|---|---|---|---|
| 2,022,824 | 12/1935 | Reich | 127—48 |
| 2,109,503 | 3/1938 | Reich | 127—48 |
| 2,357,838 | 9/1944 | Mahoney | 127—58 |
| 2,501,914 | 3/1950 | Payne | 127—58 X |
| 2,504,169 | 4/1950 | Wolfrom et al. | 127—42 X |
| 2,541,142 | 2/1951 | Zief et al. | 260—234 |
| 2,602,789 | 7/1952 | Schwartz et al. | 260—234 |
| 2,893,990 | 7/1959 | Hass et al. | 260—234 |
| 2,943,004 | 6/1960 | Haury | 127—58 |
| 2,948,716 | 8/1960 | Davis | 260—234 |

OTHER REFERENCES

Circular C440, Polarimetry, Saccharimetry, and The Sugars, National Bureau of Standards, 1942, Washington, pp. 390, 391, and 399 relied on.

Hudson: Advances in Carbohydrate Chemistry, vol. I, 1945, Academic Press, New York, page 24 relied on.

MORRIS O. WOLK, *Primary Examiner.*